(12) United States Patent
Girardeau et al.

(10) Patent No.: US 12,104,079 B2
(45) Date of Patent: Oct. 1, 2024

(54) LOW VOC ASPHALT COMPOSITION

(71) Applicant: Henry Company LLC, El Segundo, CA (US)

(72) Inventors: Tom Girardeau, West Chester, PA (US); Amba Ayambem, Glenmoore, PA (US)

(73) Assignee: Henry Company, LLC, Kimberton, PA (US)

( * ) Notice: Subject to any disclaimer, the term of this patent is extended or adjusted under 35 U.S.C. 154(b) by 47 days.

(21) Appl. No.: 15/823,855

(22) Filed: Nov. 28, 2017

(65) Prior Publication Data

US 2018/0148605 A1  May 31, 2018

Related U.S. Application Data

(60) Provisional application No. 62/426,636, filed on Nov. 28, 2016.

(51) Int. Cl.

| | |
|---|---|
| *C08L 95/00* | (2006.01) |
| *C08K 3/013* | (2018.01) |
| *C08K 5/5419* | (2006.01) |
| *C08K 5/5435* | (2006.01) |
| *C08L 83/04* | (2006.01) |
| *C09D 7/61* | (2018.01) |
| *C09D 7/63* | (2018.01) |
| *C09D 183/04* | (2006.01) |
| *C09D 195/00* | (2006.01) |
| C08G 77/04 | (2006.01) |

(52) U.S. Cl.
CPC ............ *C09D 195/00* (2013.01); *C08K 3/013* (2018.01); *C08K 5/5419* (2013.01); *C08K 5/5435* (2013.01); *C08L 83/04* (2013.01); *C08L 95/00* (2013.01); *C09D 7/61* (2018.01); *C09D 7/63* (2018.01); *C09D 183/04* (2013.01); *C08G 77/045* (2013.01); *C08L 2205/16* (2013.01); *C08L 2555/32* (2013.01); *Y02A 50/20* (2018.01)

(58) Field of Classification Search
CPC ......... C08L 95/00; C09D 195/00; C09D 7/61; C09D 7/63; C08K 3/013; C08K 5/5419; Y02A 50/235; Y02A 50/249
See application file for complete search history.

(56) References Cited

U.S. PATENT DOCUMENTS

| | | | | |
|---|---|---|---|---|
| 2,661,300 | A * | 12/1953 | Romberg | ............ C08L 2666/14 106/278 |
| 4,373,960 | A * | 2/1983 | Ward, Jr. | ................ C08L 95/00 106/241 |
| 6,323,268 | B1 * | 11/2001 | Fisher | ................... C04B 41/009 106/2 |
| 7,179,017 | B2 * | 2/2007 | Rashed | ................... C08L 95/00 106/277 |
| 2014/0373754 | A1 * | 12/2014 | Luccarelli | ................ C08J 3/091 106/621 |

* cited by examiner

*Primary Examiner* — Alexandra M Moore
(74) *Attorney, Agent, or Firm* — BakerHostetler

(57) ABSTRACT

An asphalt composition having a low VOC content composed of an asphalt material; a volatile methylated siloxane from the group of linear methylated siloxane, cyclic methylated siloxane, branched methylated siloxane and any mixtures thereof and fillers, additives organic VOC solvents conventionally used in such a composition, wherein the composition has a VOC level that allows the composition to be used in venues having restricted low levels of VOC.

20 Claims, No Drawings

LOW VOC ASPHALT COMPOSITION

CROSS-REFERENCE TO RELATED APPLICATIONS

The present application claims priority to and the benefit of U.S. patent application 62/426,636, "Low VOC Asphalt Composition" (filed on Nov. 28, 2016), the entirety of which application is incorporated herein for any and all purposes.

ENTIRETY HEREIN. TECHNICAL FIELD

This invention is related to asphalt containing compositions that have an acceptable low level of volatile organic compounds (VOC) and are used in a wide variety of construction, building and repair applications. Conventional asphalt containing compositions typically utilize relatively high amounts of volatile organic compounds and cannot be used in areas of the country that restrict the VOC of compositions that can be used to a low level. The novel composition of this invention has an acceptable low level of VOC that meets restrictive levels of VOC that are required in many areas of the country.

BACKGROUND

Asphalt containing compositions are used in construction, building and repair applications and include coating, sealing, waterproofing, joining components, cementing and repairing compositions and are used for roofs, walls, footings, foundations and the like. These compositions are commonly referred to as coating compositions, primers, adhesives, cements, mastics, caulks and sealants and are useful for roofing and waterproofing applications that include the construction and repair of built-up roofs, sealing walls, roofs, flashings and gutters and can be used to repair asphalt shingles and filing cracks and holes in shingles.

To be useful commercially, these compositions should be durable, weather resistant and easy to apply under a variety of conditions. Typically, these compositions are sold in tubs, tubes or cans and can be applied typically by hand via a trowel or with a caulking gun. These compositions contain solvents and have a high VOC content. After application, the solvents evaporate and contribute to air pollution and conflict with EPA air quality regulations in certain areas of the United States. To sell and use such compositions in certain areas in the United States, the compositions are required that have a low VOC content.

By using solvents in compositions that are exempt as set forth by agencies, such as, the South Coast Air Quality Management District (SCAQMD), compositions can be formulated to not exceeding the limited level of VOC that is permitted by strict regulations of such agencies. The novel asphalt containing composition of this invention meets low VOC requirements and can be sold and used in restricted areas of the United States and in other countries having similar restrictions.

SUMMARY

An asphalt composition having a low VOC content comprising an asphalt material; a volatile methylated siloxane selected from the group consisting of linear methylated siloxane, cyclic methylated siloxane, branched methylated siloxane and any mixtures thereof and fillers, additives and conventional organic solvents that are typically used in such a composition; and wherein the composition has a VOC level that allows the composition to be used in venues having restricted low levels of VOC.

DETAILED DESCRIPTION OF ILLUSTRATIVE EMBODIMENTS

The novel asphalt composition of this invention has a low level of VOC and can be used in areas wherein EPA requires low VOC levels that cannot be obtained with current asphalt containing compositions formulated with conventional organic solvents.

The asphalt composition of this invention is a low level VOC composition having a VOC of 150 g/l and lower. VOC levels can vary depending on the composition and its use in ranges of 10-150 g/l, 25-125 g/l, 75-140 g/l and the like.

To determine the VOC of the composition either of the following two methods can be used:
1. EPA 24 (U.S. Environmental Protection Agency Technology Transfer Network Emission Measurement Center Method 24), incorporated herein, measures the VOC content of a composition and excludes ingredients exempted by regulatory authorities.
2. The SCAQMD method, incorporated herein, is a calculation based on EPA 24 for measuring the VOC content of a composition according to Rule 1113, adopted Sep. 2, 1977, amended Feb. 5, 2016 and Rule 1168, adopted Apr. 7, 1989, amended Jan. 7, 2005.

As used herein, all percentages expressed are in weight percentages and refer to the percentages in the overall composition unless otherwise noted.

The composition of this invention comprises a mixture of asphalt, a solvent of methylated siloxane(s) and fillers, additives and a lower amount of organic VOC solvents. Generally, the composition contains about 20 to 70% by weight of asphalt and preferably, 35 to 65% by weight of asphalt; 5 to 30% by weight of the methylated siloxane solvent and preferably 5 to 20% by weight the methylated siloxane solvent and 10 to 50% by weight of fillers, additives and organic VOC solvent and preferably 15 to 40% by weight of such fillers, additives and solvents.

Solvents

The methylated siloxane solvent used in the composition is an exempted solvent in the determination of the VOC of the composition. These methylated siloxanes dissolve or partial dissolve or plasticize the asphalt of the composition and are listed as exempted solvents by the SCAQMD. One such solvent is Xiameter PMX-0244 from Dow Corning. Compositions containing such methylated siloxane solvents meet VOC requirements of the region and can be marketed as VOC compliant and as either low or very low VOC compositions. The following are methylated siloxane solvents that are useful in formulating the compositions of this invention:

Linear completely methylated siloxanes, such as hexamethyldisiloxane, octamethyltrisiloxane, decamethyltetrasiloxane, dodecamethylpentalsiloxane, tetradecamethylhexasiloxane, dimethyl silicones and siloxanes and the like;

Cyclic completely methylated siloxanes, such as hexamethylcyclotrisiloxane, octamethylcyclotetrasiloxane, decamethylcyclopentasiloxane, dodecamethylcyclohexasiloxane, cyclopolydimethylsiloxane and the like; and Branched completely methylated siloxanes, such as 1,1,1,3,5,5,5-heptamethyl 3-[(trimethylsilyl)oxy]-trisiloxane ($C_{10}H_{30}O_3Si_4$), 1,1,1,5,5,5-hexamethyl-3,3,-bis[(trimethylsilyl)oxy]-trisiloxane ($C_{12}H_{36}O_4Si_5$), pentamethyl[(trimethylsilyl)oxy]-cyclotrisilozane ($C_8H_{24}O_4Si_4$) and the like.

The composition can contain VOC solvents such as Stoddard solvent which is a man-made organic solvent from refining crude oil and is a petroleum mixture of distilled alkanes, cycloalkanes (naphthenes) and aromatic compounds. An example of such a solvent is "ShellSol D38" from Shell Chemicals. Aromatic solvents such as "ShellSol" A100 from Shell Chemicals may also be used. Hydrotreated heavy naphthenic petroleum distillates, such as FJC Mineral Oil, may also be used.

The level of these organic VOC solvents is kept to a minimum to maintain the VOC of the resulting composition at or below 150 g/l. Typically, about 1-20% by weight, based on the weight of the composition, of the organic VOC solvents are used in formulating the composition.

Asphalt

Various grades of asphalts can be used to formulate the composition of this invention and include asphalts used for paving, roofing, caulking and sealing and blended asphalts, asphaltenes and recycled asphalts. Useful asphalts can be air blown or non-air blown. Particularly useful grades of asphalts include AC 20 having a performance grade of 64-22. Other grades of asphalt include asphalts having a penetration grade up to 300 can be used. Asphalts having a penetration grade of 60 or less, such as, 40. A range of about 0.5-30 is preferred. The "penetration grade" of asphalt is an index showing the hardness of the asphalt by determining the penetration of a probe into the asphalt at a temperature of 25° C. under a predetermined load and time. For some applications, DA asphalt (de-asphaltized asphalt) may be used, i.e., asphalt that has a substantially low oil content due to solvent extraction during refining process.

Fillers and Additives

Fillers and additive can be added to the composition of this invention that are commonly used in asphaltic compositions and are not limited to the examples listed below. Fine particles of limestone, calcium carbonate, for example, from United States Lime and Minerals, and other particles and pigments also can be added. Typically, limestone having a nominal mesh of 100 or finer is used. Expanded perlite (treated or untreated), such as, "Harborlite" 900 from Imerys, diatomaceous earth, glass spheres, fly ash, mica, talc, sand, wollastonite and clay are a partial listing of useful fillers.

A variety of type, grade, and particle size of clay can be used. The clay can be a low-swell clay, a medium-swell clay or a high-swell clay. Attapulgite clay, such as, "Attagel" 15 from BASF is an example of clay that can be used and is a naturally occurring mineral of a crystalline hydrated magnesium alumino-silicate. Other clays, such as bentonite, sepiolite or kaolin clays, also can be used.

Fibers, such as, cellulosic fibers as CF-325 from Central Fiber, polyolefin fibers, fiber glass, fibers of recycled plastics, and aramid fibers (Kevlar®) can be utilized. Fibers can be selected according to length and diameter and ability to absorb liquids to provide the composition with the desired degree of workability.

Suitable polymers and polymeric adhesive can be used that include natural rubber, synthetic rubber, thermoplastic rubber, styrene/butadiene/styrene (SBS) polymers, such as "Butofan" NS 299 from BASF, ethylene vinyl acetate (EVA) polymers, acrylic polymers, polyurethane polymers, styrenated-acrylic polymers, styrene/butadiene copolymers, polymers of (meth)acrylic acid esters, polyamides polycarbonates, polyesters and thermoplastic polyurethanes.

Surfactants can be added, for example, alkyloxy-alkylamine salts, such as, isodecyloxypropyl amine acetate salt surfactant, chlorine stable, low foaming, hydrotrope surfactant "Surtech" from Surface Chemists of Florida, alkoxylated fatty amines, alkoxylated ether amines and quaternary ammonium salts.

Additional additives include colorants, aluminum flakes to improve adhesion, such as, "AD-HERE" 260 LE from ArrMaz, and additives that improve workability, ductility and product life. Aluminum and or other pigments, dyes can be added to improve aesthetics of the composition or for reflectivity or to improve chemical or corrosion resistance or weather related performance resistance. Typically, aluminum roof coatings and adhesives use such additives.

Compositions of this invention are useful, for example, in roofing cements and flashing cements that are environmentally safer than traditional VOC containing compositions and are non-toxic in use and afterwards. Such compositions are workable at ambient temperatures, easy to apply and can be stored over a wide range of temperatures.

Process for Preparation

The compositions of this invention are prepared by adding a portion of the asphalt to a blend of an organic VOC solvent and the methylated siloxane solvent and dissolved. Generally, the adhesion promoter is added and mixed, followed by the surfactant and mixed until homogeneous and other additives, such as, clay (attapulgite clay) is added. Typically, additional portions of the asphalt solvent mixture are added along with additional additives, such as, perlite and cellulose and mixed and blended as necessary to form a homogeneous mixture. Depending on the composition being formulated, additional portions of other additives, such as, limestone particles and other polymer compositions are added and mixed therein. One skilled in the art will utilize the required mixing procedure to form a homogeneous composition useful for its designed purpose.

The following are non-limiting examples that illustrate the invention. The VOC of compositions of the Example are determined using the SCAQMD METHOD described above.

EXAMPLE

The following shows the formulations of asphalt cut back intermediate compositions that are utilized in forming a cement composition. The composition of the invention provides an approximate 50% VOC reduction in comparison to the control that is a conventional composition that typically is used.

TABLE 1

Composition of Low-VOC Asphalt Cutback Compared to Control

| | % by Weight | |
|---|---|---|
| | Invention | Control |
| Components | | |
| Asphalt (PG 64-22, AC-20 Grade) | 69.7 | 74.7 |
| Stoddad Solvent ("ShellSol" D 38) | 13.3 | 25.3 |
| Octamethylcyclotetrasiloxane | 17 | 0 |
| Property | | |
| VOC (g/l) | 129 | 240 |

Example 1

The following low VOC cement composition and a control cement composition were formulated:

TABLE 2

Composition of Low-VOC Cement Compared to Control

|  | % by Weight | |
| --- | --- | --- |
|  | Invention | Control |
| Components |  |  |
| Asphalt (PG 64-22, AC-20 Grade) | 43.31 | 42.95 |
| Calcium Carbonate (Nominal 100 Mesh or Finer) | 25.21 | 25.74 |
| Octamethylcyclotetrasiloxane | 10.54 | 0.00 |
| Stoddard Solvent ("ShellSol" D38) | 8.29 | 18.40 |
| Cellulose Fiber (CF-325/Interfiber ETF of JMC) | 4.48 | 4.58 |
| Attapulgite Clay, ("Attagel" 15/Minugel FG) | 4.20 | 4.29 |
| Expanded Perlite, Sil-Cell 35 BC/H900 | 2.52 | 2.57 |
| SBR Latex, "Butofan" NS-299 | 0.88 | 0.90 |
| Alkykdiamine Surfactant ("Surtech" AS-309) | 0.48 | 0.49 |
| Amidoamine Adhesion Promoter (AD-HERE 260 LE/MWV PC-1717) | 0.08 | 0.09 |
| Property |  |  |
| Density (lbs/gal) | 9.17 | 8.96 |
| VOC (g/l) | 98.16 | 205.54 |
| Asphalt (%) (35-65% per ASTM D 4586) | 43.31 | 42.95 |
| Water (%) (Maximum 3% per ASTM D 4586) | 0.83 | .84 |
| Filler (%) (15-40% per ASTM D 4586) | 35.99 | 36.75 |
| Nonvolatile Content (%) Minimum 70% per ASTM D 4586) | 79.78 | 80.19 |
| Solvent (%) | 18.83 | 18.40 |
| Polymer (%) | 0.48 | .49 |

TABLE 3

Ingredient and Order of Addition to Prepare Low-VOC Cement

|  | Quantity (g) |
| --- | --- |
| Asphalt Cutback prepared above (Asphalt PG 64-22, AC-20 Grade in Stoddard Solvent and Octamethylcyclotetrasiloxane) Add by weight | 463.9 |
| Amidoamine Adhesion Promoter ("AD-HERE" 260 LE/MWV PC-1717) Add by weight, mix until homogeneous | 1.3 |
| Alkyldiamine Surfactant ("Surtech" AS-309) Add by weight, mix until homogeneous | 7.6 |
| Attapulgite Clay ("Attagel" 15/Minugel FG) Add by weight, mix for 15 minutes | 67.2 |
| Asphalt Cutback Add by weight, mix until homogeneous | 228.8 |
| Expanded Perlite ("Sil-Cell" 35 BC/H900) Add by weight, mix until homogeneous | 40.3 |
| Cellulose Fiber (CF-325/Interfiber ETF or JMC) Add by weight, mix until homogeneous | 44.8 |
| Asphalt Cutback Add by weight, mix until homogeneous | 153.1 |
| Cellulose Fiber (CF-325/Interfiber ETF or JMC) Add by weight, mix until homogeneous | 26.9 |
| Asphalt Cutback Add by weight, mix until homogeneous | 148.4 |
| Limestone (Nominal 100 Mesh or Finer) Add by weight, mix until homogeneous | 403.4 |
| SBR Latex, "Butofan" NS-299 Add by weight, mix until homogeneous | 14.1 |

The composition of the invention showed a better than 50% VOC reduction in comparison to the control. Each cement composition prepared above was tested for the following physical requirements set forth in ASTM D 4586 for a Type I, Class II Asphalt Roof Cement.

Uniformity—A thoroughly stirred sample did not show separation of solvent or settling that could not be overcome by moderate stirring after 72 hours at room temperature in a closed container.

Workability—The cement is of a consistency that will spread readily and permit troweling smooth coatings 2 mm to 6 mm thick on prepared roofing, saturated felt and metal surfaces at ambient temperatures of above 10° C.

Behavior at 60° C.—The cement shows no evidence of blistering; sag or slide is no greater than 6 mm.

Pliability at 0° C.—No cracking or separation of the cement from a metal substrate after application was shown.

Both the low VOC composition and the control prepared above had acceptable physical properties for uniformity, workability, behavior at 60° C. and pliability at 0° C.

Under Water Adhesion

ASTM D 3409 adhesion test is used to determine the adhesion of the cement underwater. The cement is placed on a metal lid and placed underwater and a second flamed metal lid is pressed into the lid while under water. The lids are removed from the water and separated to evaluate if the cement adhered to the flamed lids. The amount of surface that remains coated is estimated and reported. Both the low VOC composition and control prepared above showed 100% underwater adhesion of the composition to the lids.

The above cement composition of the invention had all of the above physical requirements and was considered commercially acceptable as was the control. The desired advantage of the composition of the invention is that it had the desired low VOC content in comparison to the control.

Examples 2-5

Examples 2-5 were prepared according to the invention as above and compared to the control of Example 1.

TABLE 4

Composition of Low-VOC Cement Compared to Control

|  | % by Weight | | | |
| --- | --- | --- | --- | --- |
|  | Example 2 | Example 3 | Example 4 | Example 5 |
| Components |  |  |  |  |
| Asphalt (PG 64-22, AC-20 Grade) | 43.31 |  |  | 40.91 |
| Asphalt (AC-5 Grade) |  | 48.80 | 55.14 |  |
| Calcium Carbonate | 25.21 | 9.5 | 6.05 | 25.76 |
| Octamethylcyclotetrasiloxane | 10.54 | 11.73 | 8.07 | 14.21 |
| Stoddard Solvent | 8.29 | 1.29 | 1.80 |  |
| Aromatic Solvent |  | 8.61 | 9.74 | 7.83 |
| Cellulose Fiber | 4.48 | 8.30 | 6.13 | 4.58 |
| Attapulgite Clay | 4.20 | 9.72 | 5.07 | 2.14 |
| Expanded Perlite | 2.52 |  | 6.55 | 2.58 |
| SBR Latex | 0.88 | 0.35 | 0.36 | 0.90 |
| Alkykdiamine Surfactant | 0.48 | 1.55 | 1.00 | 0.49 |
| Amidoamine Adhesion Promoter | 0.08 | 0.15 | 0.09 | 0.60 |
| Property |  |  |  |  |
| Density (lbs/gal) | 9.17 | 9.38 | 7.33 | 9.16 |
| VOC (g/l) | 98.16 | 123.47 | 107.37 | 91.98 |
| Asphalt (%) (35-65% per ASTM D 4586) | 43.31 | 48.80 | 55.14 | 40.91 |
| Water (%) (Maximum 3% per ASTM D 4586) | 0.83 | 1.14 | 0.67 | 0.63 |
| Filler (%) (15-40% per ASTM D 4586) | 35.99 | 26.55 | 23.30 | 34.84 |
| Nonvolatile Content (%) Minimum 70% per ASTM D 4586) | 79.78 | 88.01 | 87.19 | 76.83 |

TABLE 4-continued

Composition of Low-VOC Cement Compared to Control

| | % by Weight | | | |
|---|---|---|---|---|
| | Example 2 | Example 3 | Example 4 | Example 5 |
| Solvent (%) | 18.83 | 21.62 | 19.60 | 22.04 |
| Polymer (%) | 0.48 | 0.19 | 0.19 | 0.49 |

Each of the compositions of Examples 2-5 had a significantly lower VOC than the control of Example 1. Also each of the compositions of Examples 2-5 had acceptable physical properties as set forth in Example and with the advantage of low VOC.

What is claimed:

1. A low volatile organic compound (VOC) composition comprising:
   a) 20-70% by weight of an asphalt material,
   b) 5-30% by weight of a volatile methylated siloxane selected from the group consisting of linear methylated siloxane, cyclic methylated siloxane, branched methylated siloxane and any mixtures thereof; and
   c) 10-50% by weight of fillers, additives and organic VOC solvents;
   wherein the composition has a VOC of 150 g/l and lower.

2. The composition of claim 1 containing thickeners.

3. The composition of claim 1 wherein the organic VOC solvents comprise Stoddard solvent.

4. The composition of claim 1 wherein the volatile methylated siloxane comprises octamethylcyclotetrasiloxane.

5. The composition of claim 4 wherein the asphalt material comprises an asphalt having a penetration grade of about 0.5-30.

6. The composition of claim 1, wherein the composition has a VOC of 10-150 g/l.

7. The composition of claim 1, wherein the volatile methylated siloxane is selected from:
   linear hexamethyldisiloxane; linear octamethyltrisiloxane; linear decamethyltetrasiloxane; linear dodecamethylpentasiloxane; linear tetradecamethylhexasiloxane; linear dimethyl silicones; linear dimethyl siloxanes; hexamethylcyclotrisiloxane; octamethylcyclotetrasiloxane; cyclic decamethylcyclopentasiloxane; dodecamethylcyclohexasiloxane; cyclopolydimethylsiloxane; branched 1,1,1,3,5,5,5-heptamethyl 3-[(trimethylsilyl)oxyl]-trisiloxane ($C_{10}H_{30}O_3Si_4$); branched 1,1,1,5,5,5-hexamethyl-3,3,-bis[(trimethylsilyl)oxy]-trisiloxane ($C_{12}H_{36}O_4Si_5$); branched pentamethyl [(trimethylsilyl)oxy]-cyclotrisilozane ($C_8H_{24}O_4Si_4$); blends thereof; and mixtures thereof.

8. The composition of claim 7, comprising 5-20% by weight of said volatile methylated siloxane.

9. The composition of claim 8, wherein said volatile methylated siloxane is octamethylcyclotetrasiloxane.

10. The composition of claim 1, wherein the asphalt material comprises an asphalt having a penetration grade of about 0.5-60.

11. The composition of claim 1, wherein the asphalt material is air-blown.

12. The composition of claim 1, wherein the asphalt material is non-air-blown.

13. An asphalt cut back intermediate composition comprising:
   a) 20-70% by weight of an asphalt material,
   b) 5-30% by weight of a volatile methylated siloxane selected from the group consisting of linear methylated siloxane, cyclic methylated siloxane, branched methylated siloxane and any mixtures thereof; and
   c) organic VOC solvents;
   wherein the composition has a VOC of 150 g/l and lower.

14. The composition of claim 13, wherein the asphalt material comprises an asphalt having a penetration grade of about 0.5-30.

15. The composition of claim 13, wherein the volatile methylated siloxane is selected from:
   linear hexamethyldisiloxane; linear octamethyltrisiloxane; linear decamethyltetrasiloxane; linear dodecamethylpentasiloxane; linear tetradecamethylhexasiloxane; linear dimethyl silicones; linear dimethyl siloxanes; hexamethylcyclotrisiloxane; octamethylcyclotetrasiloxane; cyclic decamethylcyclopentasiloxane; dodecamethylcyclohexasiloxane; cyclopolydimethylsiloxane; branched 1,1,1,3,5,5,5-heptamethyl 3-[(trimethylsilyl)oxyl]-trisiloxane ($C_{10}H_{30}O_3Si_4$); branched 1,1,1,5,5,5-hexamethyl-3,3,-bis[(trimethylsilyl)oxy]-trisiloxane ($C_{12}H_{36}O_4Si_5$); branched pentamethyl [(trimethylsilyl)oxy]-cyclotrisilozane ($C_8H_{24}O_4Si_4$); blends thereof; and mixtures thereof.

16. The composition of claim 13, wherein the asphalt material comprises an asphalt having a penetration grade of about 0.5-60.

17. The composition of claim 13, comprising 5-20% by weight of said volatile methylated siloxane.

18. The composition of claim 13, wherein said volatile methylated siloxane is octamethylcyclotetrasiloxane.

19. The composition of claim 13, wherein the asphalt material is air-blown.

20. The composition of claim 13, wherein the asphalt material is non-air-blown.

\* \* \* \* \*